Aug. 4, 1959     C. T. HAYES     2,898,201
GAS TREATING APPARATUS
Filed May 10, 1955

INVENTOR.
CLETUS T. HAYES
BY
Frederick W. Raring
AGENT

United States Patent Office 2,898,201
Patented Aug. 4, 1959

2,898,201

GAS TREATING APPARATUS

Cletus T. Hayes, Philadelphia, Pa., assignor to Oxy-Catalyst, Inc., a corporation of Pennsylvania Application May 10, 1955, Serial No. 507,433

6 Claims. (Cl. 23—288)

This invention relates to apparatus for catalytically oxidizing the combustible constituents of gas streams.

Frequently, it is desired to oxidize the combustible constituents in a gas stream in which the concentration of combustibles is relatively low. For example, lithographing ovens, roasting ovens, paint drying ovens and the like emit a stream of exhaust gases containing minor concentrations of various combustible organic materials which pose a serious air pollution threat, and elimination of these materials by catalytic oxidation presents a convenient and simple solution to the problem. Ordinary oxidation by means of a flame, is relatively difficult and is frequently impossible because of the fact that the combustible constituents are present in such minor concentrations. Such flame oxidation processes can be carried out only if either fuel is added to the gas stream in order to produce a combustible mixture or if the gas stream is heated to an elevated temperature of the order of 1600° F. or more at which the minor concentration of combustible constituents will be consumed.

A desirable alternative to oxidation by means of a flame is to eliminate the combustible components of the gas stream catalytically since it is merely necessary to heat the gas stream uniformly throughout to a temperature in the range of about 700°–1000° F. (depending upon the particular nature of the effluent and the concentration of combustibles therein) and to subsequently pass the oven effluent through a suitable bed of oxidation catalyst. This process, if properly carried out, will result in elimination of substantially all traces of oxidizable materials in the gas stream. Moreover, under some circumstances it has been found that the temperature rise effected by the catalytic oxidation process is sufficient to justify heat recovery from the stream of effluent by regenerative or recirculative measures. Under such circumstances then, a serious threat to air pollution conditions is alleviated and at the same time a valuable source of heat is recovered. Catalytic oxidation thus presents highly attractive possibilities in the field of drying ovens or lithographing ovens of the types commonly used which are causing increasing concern insofar as air pollution problems are involved.

There are, of course, other circumstances under which it is desirable to oxidize combustible constituents in gas streams. For example, catalysts used in the reforming or cracking of hydrocarbons become coated during the process with a layer of carbonaceous material which must be periodically removed. This is accomplished by passing a regenerative gas through the reactor chamber, which gas on leaving the reactor chamber contains CO and free oxygen, usually about 5–9% CO being present. Such gaseous mixtures as these, while not posing an air pollution threat, do contain sufficient quantities of chemical heat to justify heat regeneration or other types of recovery. At the same time, mixtures such as these, because of their low CO content, are not easily burned by means of a flame. In this instance also, catalytic oxidation presents a convenient heat recovery method which may be considerably more effective and economical than the alternative of flame combustion.

In order to effect substantially complete oxidation of the combustible components of a gas stream, it is, as previously mentioned, necessary that the temperature of the gas stream be at a somewhat elevated level, which for a particular catalyst will depend to a large extent upon the concentration of the combustibles in the gas stream. Where it is desired to eliminate traces or minor concentrations of combustible constituents in oven effluent for example, it is frequently necessary to preheat the gas stream prior to catalytic oxidation to a temperature in the range of about 700°–1000° F. Under some circumstances it has been found that such preheat need be provided only when the process is initially started and that once the reaction has been started, the heat liberated by the catalytic oxidation process will maintain the catalyst at the proper temperature for complete clean-up. Under other circumstances, particularly where the concentration of combustibles is extremely low, it is necessary to heat the gas stream during the entire process, since the heat released by the oxidation process is not sufficient to maintain the minimum catalyst operating temperature.

In the prior art, catalytic oxidation apparatus for gas streams has frequently been provided with a burner disposed in the path of the gas stream in order that the products of combustion produced by burning of fuel can be intermixed with the gas stream to raise its temperature to the required level for catalytic oxidation. In general, the prior art teaches that the burner may be disposed in the vicinity of the catalyst bed so that the gases will pass successively over the burner and then over the catalyst bed. This arrangement has frequently been found to be deficient in that the products of combustion produced at the burner are not intimately and completely intermixed with the original gas stream so that the gases entering the catalyst bed will not be of a uniform temperature throughout but will have stratified areas of high temperature and other areas of relatively low temperature which may not be sufficient to achieve substantially complete clean-up. This problem of intermixing completely the effluent or other stream of gases containing oxidizable components with the products of combustion from the burner has proved to be extremely vexatious and it has frequently been found that relatively poor or ineffective clean-up results from incomplete intermixing.

A further shortcoming of the prior art teachings in the matter of apparatus for catalytic oxidation of gases, concerns the type of preheat burner required. In some prior art installations, it has been found necessary to utilize a premix type fuel burner for the reason that the more desirable and simpler atmospheric type burner will not operate effectively in the moving gas stream. This is decidedly disadvantageous in that more complex and more expensive equipment is required thereby raising the cost of such apparatus. A simple atmospheric type inspirator burner would be most desirable rather than a premix burner, for the reason that such inspirator type burners do not require auxiliary equipment such as mixers and blowers which, of course, contribute materially to the cost of providing catalytic oxidation apparatus for gas streams.

It is an object of the present invention to provide a simple, compact, easily manufactured and maintained unit for catalytic oxidation of the combustible components of a gas stream. The apparatus of the invention incorporates means for premixing products of combustion from a burner with the gas stream in order to provide the necessary preheat for the catalytic process. The apparatus also provides for efficient and intimate intermixing of the gases and the combustion products and the parts and components of the apparatus are so arranged that the gas stream as it enters the catalyst bed will be of uniform temperature and composition throughout.

These and other objects of the invention will be apparent from the following description and from the annexed drawings in which.

Figure 1:
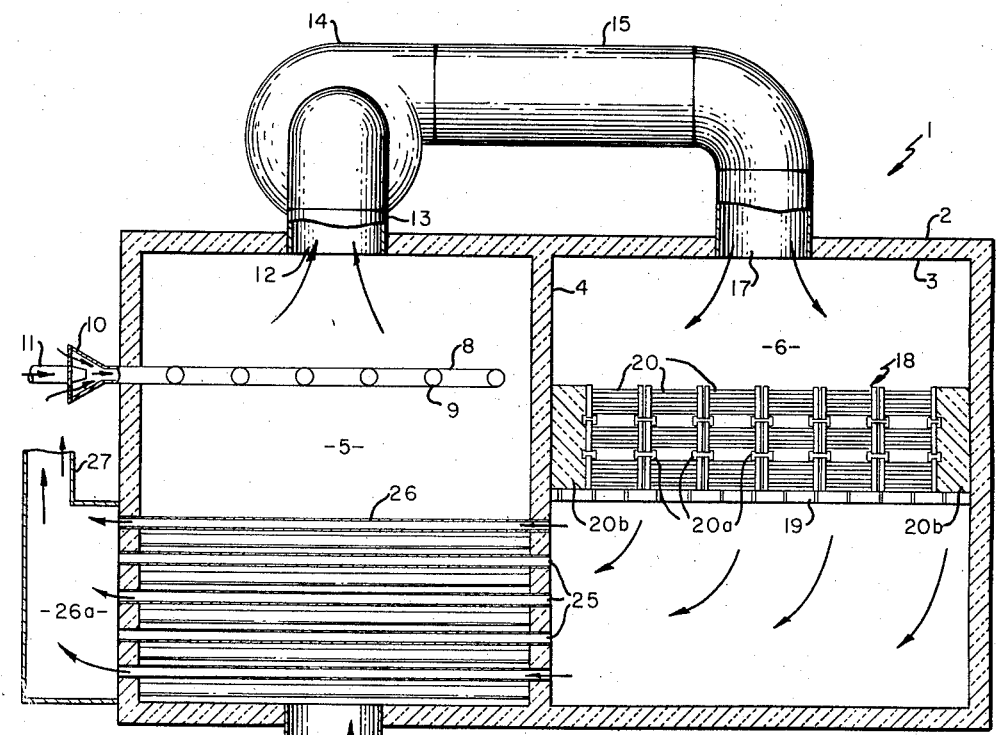
Fig. 1 is a cross-sectional view of a preferred embodiment of the invention.

Referring to the drawing, the reference numeral 1 generally indicates a chamber consisting of an outer steel casing 2 lined with a suitable refractory 3. The interior of the chamber 1 is divided by a bridge wall 4 into a preheat zone indicated by the reference numeral 5 and an oxidation zone 6. Preheat zone 5 is provided with a gas inlet 7, a heat exchanger 26 over which the incoming gases flow, and a burner consisting of a central conduit 8 having a plurality of branch conduits 9 extending therefrom. The branch conduits 9 are each provided with suitable fuel ports as indicated for the burning of a suitable fuel such as a gaseous fuel, although a liquid fuel might be used if desired. The burner is provided exteriorly of the casing 1 with a venturi type inspirator generally indicated by the reference numeral 10. Fuel is supplied to this burner from a suitable source by a line 11.

At the upper portion of the preheat zone 5 there is provided a vent 12 which is connected to a conduit 13 which in turn enters a fluid impeller 14 such as a centrifugal blower. The blower at its outlet side is in turn connected with a second conduit 15 which enters the oxidation zone 6 by means of an opening 17. It should particularly be noted that, as indicated in the drawing, the conduit 15 enters oxidation zone 6 at the upper portion thereof for reasons which will be explained more fully below.

Figure 2:
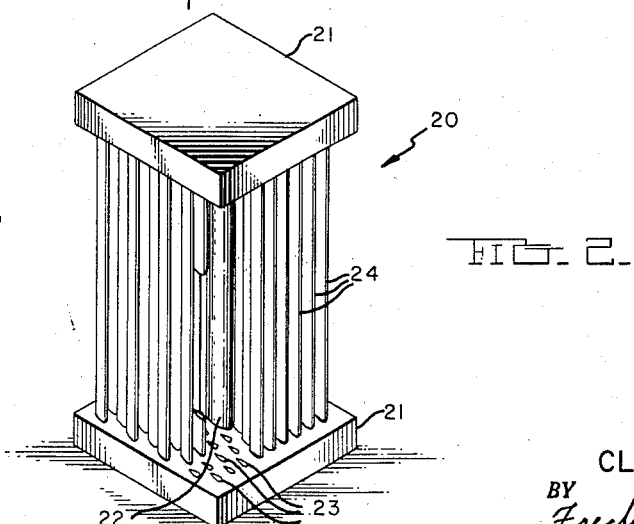
Fig. 2 is a perspective view of a catalytic unit of a type usable in the practice of the invention.

A catalyst bed generally indicated by the reference numeral 18 is supported substantially centrally within the oxidation zone 6 and extends therein from each of the walls to the opposite wall so as to cover the entire cross-sectional area of this zone. The bed itself rests upon a suitable open grate 19 which supports a plurality of layers of catalytic units 20 of the type shown in Fig. 2. Each of these units consists of a pair of substantially square end plates 21 which are rigidly connected in spaced apart parallel relationship by a center post 22 which is secured at each end to one of the end plates. The opposed faces of the end plates are provided with a plurality of aligned apertures 23 which accommodate the ends of a plurality of rod-like elements 24. Preferably the elements 24 should be freely slidable in the apertures 23 in order to prevent the development of thermal stresses upon heating of the units 18 to their operating temperature which may be as high as 1400–1600° F. The units 18 are preferably composed entirely of ceramic material resistant to high temperatures and immune to destruction by thermal shock. It has been found, for example, that porcelain of the grade commonly used in the manufacture of spark plugs is ideally suited for these units.

The rods 24 of the units function as supports for a catalyst carrier in the form of an activated form of an inorganic oxide such as alumina, thoria, magnesia, beryllia, or mixtures thereof or other suitable forms of activated oxides. Such oxides are provided on the rods 24 in the form of extremely thin superficial coatings which may be of the order of about 0.0001″ to 0.006″ in thickness. The coatings function as carriers for a finely divided catalyst material such as platinum or palladium or other suitable catalytic metal. Catalysts of this particular type are described more fully in the copending application of Eugene J. Houdry, Serial Number 159,191, filed May 1, 1950, for Process and Apparatus for Contacting Operations, now Patent No. 2,730,434, and will not be further described here. It should be mentioned that while catalysts of the type shown have proved to be eminently satisfactory for the oxidation of combustible constituents in gas streams, it is within the scope of the invention to utilize other types of catalysts such as pellet bed catalysts or supported catalysts in which the support is provided in forms other than that shown in Figs. 1 and 2.

In the embodiment shown, the catalytic units 20 are stacked in a plurality of layers with the meeting end plates of adjacent units being received by I-shaped spacer members 20a. Suitable insulation 20b is provided between the sides of the beds and the refractory lining 3. This arrangement of stacking the catalytic units forces all of the gases flowing through the chamber 6 to flow through the catalyst bed 18 and over the catalytically active surfaces of the rod-like elements 24 and prevents any by-passing of the bed.

The previously mentioned heat exchanger 26 comprises a plurality of tubes which open into the lower end of oxidation zone 6 as indicated at 25a and extend across the preheat zone 5 to a suitable manifold 26a from which a stack 27 extends. The tubes of the heat exchanger in the preferred embodiment are provided in a plurality of rows with the individual tubes of each row being staggered relative to the tubes in the rows immediately thereabove and therebelow.

In operation, the inlet gases enter preheat zone 5 by means of the conduit 7. At initial start-up these gases will not be preheated by indirect heat exchange with exit gases but after the process is initiated, the inlet gases will receive considerable heat from the outgoing gases passing through heat exchanger 26. For example, in the case of drying oven installations, the inlet gases may be at a temperature in the range of about 325° F. to 600° F. at the most. The temperature of these gases may be raised substantially by indirect heat exchange with outgoing gases which may be at a temperature in the range of as high as 1100°–1300° F. The incoming gases will then flow over the burner 8 and during passage through the upper portion of zone 5 will tend to become intermixed with the products of combustion from the burner. This intermixture however will generally not be complete by the time the gases leave the preheat zone 5 through the outlet 12 for the reason that very little turbulence will be created and there will be no mechanical intermixing of the gas stream with the combustion products. Upon passing through the fluid impelling means 14, however, intimate and complete intermixing will be effected by the action of the blower. Subsequently the gas stream flows through conduit 15 and downwardly through oxidation zone 6.

By virtue of the fact that the gaseous mixture flows downwardly, rather than upwardly, through oxidation zone 6, additional intermixing of the combustion products and the gases is achieved and the development of hot spots in the catalyst bed 18 is avoided. Forced downward flow of the gases as in the instant invention, contributes to intermixture because of the fact that any localized areas of gases which are at a higher temperature than the medium as a whole will tend to rise relative to the surrounding cooler gases and will as a result be diffused throughout the entire medium. Where gases are flowing upwardly, on the other hand, any localized areas of gases hotter than the surrounding gases tend to rise by themselves and complete intermixing is, as a result, not achieved. Hot spots within the catalyst bed are avoided because of the same phenomenon; that is, the gases in the vicinity of the hot spot will have a greater tendency to rise than the surrounding gases, thereby causing a turbulent condition with resulting diffusion of the hotter gases into the relatively cooler surrounding gases.

The gases in flowing through the catalyst bed will, of course, have all their combustible and oxidizable constituents catalytically oxidized. To this end it should be mentioned that the bed must be provided with sufficient surface to accomplish complete oxidation or clean-up. Obviously this is a matter which will concern the rate of flow of the gases, the type of catalyst and other variables which can be determined from a detailed consideration of a particular set of circumstances under which oxidation catalysis is desired. It should further be mentioned however that with the arrangement shown, the provision of additional catalytic surface can be accomplished by merely increasing the number of layers of catalytic units.

The gases will be heated to a relatively elevated temperature by oxidation upon passage through the catalyst bed. The exact temperature attained will be dependent upon such factors as the inlet temperature of the gases and more particularly the concentration of combustibles therein. It can be stated, however, that it is not uncommon for a gas stream containing a relatively minor concentration of solvents to be heated to a temperature in the range of 1100°–1300° F. from a temperature of about 500°–700° F. by the catalytic oxidation of the solvents. Subsequently the gas stream will leave the oxidation chamber 6 through the outlets 25 and flow through the heat exchanger 26 in which a portion of the sensible heat of the gases will be transferred to the incoming gases as explained above.

By virtue of the fact that the blower 14 is disposed downstream from the preheat zone 5, a negative pressure is maintained within this zone relative to the oxidation zone 6. This arrangement permits the use of a simple atmospheric type burner rather than a pressurized burner as has been common in the prior art. With the arrangement shown in Fig. 1 of a simple atmospheric type inspirator burner using gaseous fuel, the primary air will readily be drawn into the inspirator 10 and the fuel will be burned at the ports in the burner head 8, 9. Other types of atmospheric burners might, of course, be employed if desired.

A further advantage of the invention is that the temperature of the gases entering conduit 13 and blower 14 will be comparatively constant while the apparatus is in operation. Therefore, the blower 14 will be handling a comparatively constant volume of gases per unit time thus obviating the need for a control system to increase or decrease the fan speed. By way of contrast, where the blower is placed downstream from the catalyst (as in prior art devices) the temperature of the gases entering the blower, and consequently the volume of gases entering the blower, will vary with the concentration of combustibles therein since the temperature rise and the increase in volume of the gases passing through the catalyst bed varies with their content of combustibles. As a result it is necessary with such arrangements to vary the speed of the blower in order to maintain a comparatively constant rate of exhausting from the oven, and this would necessitate the use of a controlling means for the blower.

If desirable a suitable thermal responsive element may be disposed within the preheat zone 5 adjacent the upper end thereof or within the oxidation zone 6 at a point upstream from the catalyst bed 18 for the purpose of controlling the supply of fuel to the burner itself. As mentioned above, under some circumstances it will be found that little or no preheat is required after the process of catalytic oxidation has been initiated while under other circumstances, because of the relatively low concentration of combustibles in the gas stream, it might be found that a continuing relatively high amount of preheat must be imparted to the gas stream. A suitable modulating valve may be provided in the line 11, which valve would be responsive to the sensing element as explained above, to thereby regulate the amount of fuel supplied to the burner in accordance with carrying requirements of preheat.

Various modifications of the invention, within the scope of the appended claims, will be apparent to those skilled in the art.

I claim:

1. Apparatus for catalytically oxidizing the combustible constituents of a gas stream comprising a first chamber containing a burner for producing hot combustion gases, an inlet into said chamber for admitting said gas stream thereto, an outlet from said chamber for withdrawing therefrom said gas stream mixed with hot combustion gases, a second chamber containing a bed of oxidation catalyst and having a gas inlet thereto, means forming a passage for said gas stream and connecting the outlet from said first chamber and the gas inlet to said second chamber, fluid impeller means in said passage and having its suction side arranged to draw upon the outlet from said first chamber and having its discharge side arranged to discharge said gas stream mixed with said hot combustion products into the inlet to said second chamber and through said bed of oxidation catalyst, said impeller means being adapted at the same time to mix mechanically said gas stream and said combustion products to provide a homogeneous mixture thereof, so as to thus provide a mixture of uniform temperature before introduction into said second chamber.

2. Apparatus for catalytically oxidizing combustible constituents of a gas stream comprising a first chamber containing heating means in direct heat exchange relationship with said gas stream for adding heat to said gas stream, an inlet into said chamber for admitting said gas stream thereto, an outlet from said chamber for withdrawing said gas stream therefrom after addition of heat thereto, a second chamber containing a bed of oxidation catalyst and having a gas inlet thereto, means forming a passage for said gas stream and connecting the outlet from said first chamber and the gas inlet to said second chamber, fluid impeller means in said passage and having its suction side arranged to draw upon the outlet from said first chamber and having its discharge side arranged to discharge said gas stream into the inlet to said second chamber and through said bed of oxidation catalyst, said impeller means being adapted at the same time to mechanically mix said gas stream so as thus to provide a mixture of uniform temperature before introduction into said second chamber.

3. Apparatus in accordance with claim 1 in which said bed of oxidation catalyst is arranged within said second chamber so that said heated gas stream, containing combustible constituents, passes downwardly through said bed of oxidation catalyst, thereby tending to eliminate inequalities in bed temperature resulting from non-homogeneity of said gas stream.

4. Apparatus for catalytically oxidizing combustible constitutents of a gas stream comprising a first chamber containing a burner for burning a fuel and producing hot combustion gases, said burner having an inspirator adapted to inspirate combustion air from the atmosphere to provide a suitable fuel-air mixture at the burner ports, an inlet into said chamber for admitting said gas stream thereto, an outlet from said chamber for withdrawing said gas stream therefrom mixed with hot combustion gases, a second chamber containing a bed of oxidation catalyst and having a gas inlet thereto, means forming a passage for said gas stream and connecting the outlet from said first chamber and the gas inlet to said second chamber, fluid impeller means in said passage and having its suction side arranged to draw upon the outlet from said first chamber so as thus to maintain said first chamber at a pressure which will permit the operation of said inspirator-type burner, and having its discharge side arranged to discharge said gas stream mixed with said hot combustion products into the inlet to said second chamber and through said bed of oxidation catalyst, said impeller means being adapted at the same time to mix mechanically said gas stream and said combustion products to provide a homogeneous mixture thereof, so as to thus provide a mixture of uniform temperature before introduction into said second chamber.

5. Apparatus for catalytically oxidizing combustible constituents of a gas stream comprising two side-by-side chambers, the first chamber containing a burner for producing hot combustion gases, said burner having burner ports and an inspirator for the inspiration of combustion air from the atmosphere to provide a fuel-air mixture suitable for burning at the burner ports, a gas inlet into said first chamber for admitting said gas stream thereto, an outlet from said first chamber for withdrawing therefrom said gas stream mixed with hot combustion gases, said second chamber containing a bed of oxidation catalyst extending horizontally across said chamber, and having a gas inlet thereto adjacent the top of said chamber, means forming a passage for said gas stream and connecting the outlet from said first chamber and the gas inlet to said second chamber, fluid impeller means in said passage and having its suction side arranged to draw upon the outlet from said first chamber and thus to maintain said first chamber at a pressure which permits the operation of said inspirator-type burner, and having its discharge side arranged to discharge said gas stream mixed with said hot combustion products into the inlet to said second chamber and downwardly through said bed of oxidation catalyst, said impeller means being adapted at the same time to mix mechanically said gas stream and said combustion products to provide a homogeneous mixture thereof, so as to thus provide a mixture of uniform temperature before introduction into said second chamber, and gas outlet means for the treated gas stream adjacent the bottom of said second chamber.

6. Apparatus in accordance with claim 5 in which a heat exchanger is arranged in the bottom portion of said first chamber over which the relatively cool incoming gas stream passes, and means connecting said second chamber with said heat exchanger such that the relatively hot gas stream leaving said bed of oxidation catalyst passes through said heat exchanger in indirect heat exchange relationship with the relatively cool incoming gas stream.

References Cited in the file of this patent

UNITED STATES PATENTS

| | | |
|---|---|---|
| 1,906,447 | Darrah | May 2, 1933 |
| 2,658,742 | Suter et al. | Nov. 10, 1953 |
| 2,666,692 | Dolezal | Jan. 19, 1954 |
| 2,667,410 | Pierce | Jan. 26, 1954 |